(12) United States Patent
Rogg

(10) Patent No.: US 6,588,294 B1
(45) Date of Patent: Jul. 8, 2003

(54) GEARBOX FOR A MOTOR VEHICLE

(75) Inventor: Andreas Rogg, Lübeck (DE)

(73) Assignee: LuK Lamellen und Kupplungsbau Beteiliungs KG, Bühl (DE)

( * ) Notice: Subject to any disclaimer, the term of this patent is extended or adjusted under 35 U.S.C. 154(b) by 7 days.

(21) Appl. No.: 09/787,538

(22) PCT Filed: Jul. 18, 2000

(86) PCT No.: PCT/DE00/02357

§ 371 (c)(1),
(2), (4) Date: Jun. 15, 2001

(87) PCT Pub. No.: WO01/09534

PCT Pub. Date: Feb. 8, 2001

(30) Foreign Application Priority Data

Jul. 28, 1999 (DE) .......................... 199 38 479

(51) Int. Cl.⁷ .............................. B60K 20/00
(52) U.S. Cl. ................... 74/473.21; 192/219.5
(58) Field of Search .................. 74/473.12, 473.21, 74/473.23, 473.24, 473.25, 473.26; 192/219.5

(56) References Cited

U.S. PATENT DOCUMENTS

| 4,310,081 A | * | 1/1982 | Kolacz | .................... 192/219.5 |
| 5,649,452 A | * | 7/1997 | Osborn et al. | ................. 192/44 |
| 6,170,353 B1 | * | 1/2001 | Worner et al. | ........... 74/473.21 |
| 6,321,612 B1 | * | 11/2001 | Leimbach et al. | ............ 74/335 |

FOREIGN PATENT DOCUMENTS

| DE | 4332478 C2 | * | 7/1996 | .......... B60K/41/00 |
| JP | 04063750 | | 2/1992 | |
| WO | WO 99/28655 | | 6/1999 | |

\* cited by examiner

Primary Examiner—David Fenstermacher
(74) Attorney, Agent, or Firm—Alfred J. Mangels

(57) ABSTRACT

A gearbox for a motor vehicle having at least one input shaft and one output shaft and including a plurality of gears. The gears can be engaged and disengaged by an actuator. The gearbox further includes a parking brake that can be actuated by a gear change actuator and that serves to block rotation of the output shaft. The parking brake can be a gear and pawl arrangement in which the pawl is selectively engageable with the gear to prevent gear rotation, or it can be in the form of a shiftable jaw clutch.

17 Claims, 3 Drawing Sheets

GEARBOX FOR A MOTOR VEHICLE

BACKGROUND OF THE INVENTION

1. Field of the Invention

The present invention concerns a shift mechanism for a motor vehicle with at least one input shaft as well as an output shaft and a plurality of gears arranged on the shafts, which can be brought into and out of engagement by means of an actuator.

2. Description of the Related Art

Transmissions for motor vehicles are already known in many executions. On the basis of the cost advantage of manually shifted transmissions, by which the driver determines the gear change, such manual transmissions have been and are still applied broadly. In addition, automatic transmissions have also become known, by which in the field of passenger cars fully automated shift mechanisms with a hydrodynamic converter and a coupled planetary transmission have become important. On account of the torque converter there is in such transmissions no direct connection between the vehicle and the engine with its braking force, so that such automatic transmissions are often provided with a parking lock, by which it allows securing the vehicle against unintentional rolling movement. In those known automatic transmissions the locking process is actuated by the driver of the vehicle, in which he moves the shift lever into the parking position P, which through an actuation mechanism in the form of for example pull or push rods, results in blocking of the output shaft of the transmission.

Based on the cost advantage of manual transmissions as described above and despite it, the existing tendency for increased comfort in motor vehicles, automated shift mechanisms have already become known, by which an actuator in the form for example of an electric motor or two electric motors relieves the driver of the burden of the selection process and the gear change process. Also in a motor vehicle with an automated shift mechanism a safeguard is desirable against unintentional rolling movement of the vehicle on the ground of the resulting danger of accidents.

An object of the invention is therefore based on providing a shift mechanism for a motor vehicle, which safely prevents unintentional movement of the vehicle.

SUMMARY OF THE INVENTION

In accordance with the invention, to solve that problem a shift mechanism is provided having at least one input shaft as well as an output shaft, and a plurality of gears arranged on the shafts and which can be brought into and out of engagement by means of an actuator, and including a parking lock device that is actuated by the actuator to block the output shaft. Advantageous improvements of the shift mechanism are retained in the dependent claims.

In accordance with the invention a shift mechanism for a motor vehicle is provided with at least one input shaft as well as at least one output shaft, and a multitude of gears arranged on shafts, which can be engaged and disengaged by means of an actuator, whereby the actuator can also be utilized to actuate a parking lock device to block the output shaft of the transmission. That is, in other words, a shift mechanism in accordance with the invention, by which the selection process and the shifting process for shifting gears is caused by an actuator in the form of, for example, one or more electric motors, a parking lock device is provided for blocking the output shaft of the transmission, and the parking lock device is also activated by the actuator for the shift mechanism, therefore, for example, the transmission shifter, and it can be moved into a parking lock position and also disengaged from it again. The actuator can thereby activate the parking lock device, for example by an activation device provided between the parking lock device and the actuator.

The parking lock device can be a parking lock gear mounted non-rotatably on a transmission shaft and a pawl that can be engaged therewith, which through a pre-stressed spring element can be releasably brought into engagement with the parking lock gear. The pre-stressed spring element actuated by the actuator serves to bring the transmission into the parking lock position by the pawl and the parking lock gear, when upon parking of the motor vehicle a direct tooth-to-tooth position exists, thus when parking the vehicle there is no engagement of the pawl in the parking lock gear. A minute movement of the motor vehicle then leads to a rotation of the parking lock gear relative to the pawl that is under tension from the pre-stressed spring element, so that the pawl tooth after that brief relative movement engages with the gear tooth of the parking lock gear and thereby brings about the parking lock position of the shift mechanism in accordance with the invention.

In accordance with a further embodiment the parking lock can also be an interconnected shift coupling that is actuated by a pre-stressed spring element and is provided in the drive train of a motor vehicle, and by means of which the output side portion of the drive train that is coupled with the transmission output shaft can be blocked. The shift coupling can be arranged in the output side portion of the drive train after the transmission. Such a construction then is advantageous, for example, when the transmission is in the form of a hybrid transmission, that is, with an available electric motor coupled with and in addition to the internal-combustion engine, which can also operate as a generator and thereby carry out a starter-generator function. One such electric motor can then also be utilized to start the internal-combustion engine, whereby for that purpose the drive train after the transmission output shaft must be disengaged by the shift coupling. The electric motor can also be installed to deliver torque to the drive train, or for recuperation during the braking of the motor vehicle. One or more shift couplings can also be provided in the drive train near the shift coupling for carrying out the parking lock function for disconnecting the drive train. The shift coupling for the parking lock function can also be installed to engage and disengage the drive train, so that both functions, namely the parking lock function and the engaging and disengaging of the drive train, can be carried out by only one shift coupling. Thereby the actuator is utilized for the shifting process in the transmission as well as for the actuation of the parking lock shift coupling for the parking lock function, and in the case of one or more additional shift couplings it is also utilized to actuate those couplings so that only one actuator is necessary.

To bring about a parking lock function the actuator provided on the shift mechanism can actuate a spring element, which on its side actuates the shift coupling which is provided in the drive train to disengage the drive train of the motor vehicle, and by that means it can block the output side portion of the drive train that is coupled with the transmission output shaft, in which the shift coupling serves for example to block the output side portion of the drive train against the transmission housing.

Therewith, to assure a secure engagement position at the tooth-to-tooth condition of the pawl to the parking lock gear described previously, or also at both interconnected shift coupling halves, the invention provides for securing them in position by the actuator and/or the actuating mechanism, in which the spring element is in a prestressed position. When the actuator is provided in the form of an electric motor for example, it will no longer be energized after parking the motor vehicle, to conserve the power supply of the vehicle, so that it no longer actively actuates the spring element. By fixing the actuator in the position where it pre-stresses the spring element, provision is made for the pre-stress of the spring element to prevent the disengagement of the actuator from its position that corresponds with the parking lock position of the shift mechanism. For that purpose the actuator can actuate the spring element, for example through an irreversible gear step, for example a worm gear drive, whereby, however, the actuator and/or the actuating mechanism is also locked by means of a stop in which the pre-stressed spring element can be secured. That stop can for example be formed similar to a stop notch of a central selector shaft. It is also possible to secure the actuator and/or the actuation mechanism by means of a load moment lock in which the spring element is in its pre-stressed position. Also when the spring element is in its pre-stressed position, the actuator can still carry out adjustment operations in the drive train of the motor vehicle and/or in the transmission.

In accordance with the invention it is thereby provided that the shift mechanism is an automatic transmission, or one provided with a load-shifting clutch and a shiftable transmission without interruption of the pulling force, or also a hybrid transmission, as has already been described.

In accordance with a further embodiment the shift mechanism is distinguished in that the mechanism is only shiftable into the parking lock position when all shift rods or other shift elements of the transmission are in the neutral position. Hereby it is assured that no conflicting condition can occur in such a way that the transmission would be, for example, in the forward driving position in first gear and the actuator would actuate the pawl or the shift clutch, which would lead to a sudden stoppage of the transmission output shaft, although the driver of the motor vehicle is considering moving in first gear.

It is also provided, after reaching the parking lock position, to shift the transmission into a neutral position, which can also be formed by an additional neutral path. Moreover, a wide shift fork opening can be provided, for example, so that in a transmission with a central selector shaft a selector finger can engage the shift fork opening of the shift rod, which actuates the pawl or the shift coupling, so that the parking lock position of the transmission will be brought about, and thereafter disengagement of the shift finger from the wide shift fork opening is brought about without thereby canceling the parking lock position. This is, by way of example, advantageous when the internal-combustion engine of the motor vehicle can only be started in a neutral position and otherwise the service brake of the motor vehicle would have to be activated to start the engine.

It is also provided that the transmission can be shifted into the forward driving position or the backing-up driving position after achieving the parking lock position. Shifting into the forward driving position, that is, for example, into first gear with the parking lock activated, the parking lock position can, for example, be utilized to prevent the vehicle from rolling backwards during a short duration stop on an inclined road, and for further forward and uphill travel of the motor vehicle the first gear is already engaged, whereby the drive clutch is disengaged and then the actuator serves to release the parking lock position and simultaneously engages the drive clutch, so that it is possible to start uphill without rolling backwards.

In accordance with the invention it is provided that the actuator available for carrying out the shift operations of the transmission, that is, by way of example, the transmission actuator, also is included to actuate one or more clutches provided in the drive train of the motor vehicle. It is thereby advantageous, by way of example, when a hybrid drive is installed, in which an electric motor is provided near the internal-combustion engine, that serves to start the internal-combustion engine, and that also is included as a generator for the provision of electrical potential to the power supply of the motor vehicle and provides for recuperation during braking of the motor vehicle, and it also can provide torque to the drive train of the motor vehicle. By that arrangement the electric motor operates on the transmission input shaft as well as the drive shaft, as well as on the transmission output shaft, so that two clutches are provided, that, by way of example, can be interconnected shift clutches, which are actuated by the actuator. When the one or more additional shift clutches are actuated by the actuator through an actuation mechanism, they can be arranged in an engaged or disengaged position of the one or more shift clutches. The actuator can also be drawn upon to perform additional adjustment procedures in the engaged or disengaged position, such as, by way of example, the actuation of additional shift couplings that are available in the drive train, or also for shift operations in the shift mechanism. The actuation mechanism for the one or more shift couplings can, by way of example, be arranged as an irreversible gear stage similar to the actuation mechanism for the parking lock device, a stop, or a load-moment lock. The actuator is therefore utilized in the adjustment procedures in the shift mechanism, for the actuation of the parking lock device, and/or for the actuation of one or more shift clutches in the drive train of the motor vehicle.

BRIEF DESCRIPTION OF THE DRAWINGS

The invention will be further described below on the basis of the drawings. They show in.

DESCRIPTION OF THE PREFERRED EMBODIMENTS

Figure 1:
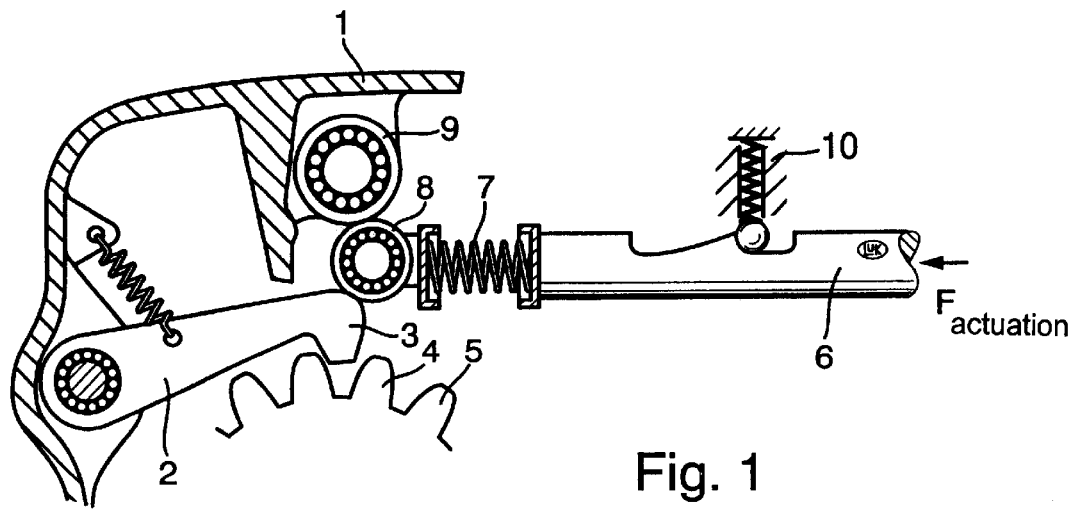
FIG. 1 a schematic representation of a section of a shift mechanism with a parking lock.

FIG. 1 of the drawings shows quite generally a section of a shift mechanism in accordance with to the invention with a schematic representation of the parking lock.

Rotatably attached to a transmission housing 1 that is only partially represented is a pawl 2 that can be releasably engaged by way of its pawl tooth 3 with a complementary gear tooth 4 of a partially shown parking lock gear 5.

The parking lock gear 5 is thereby secured in position against axial and rotational motion on an output shaft of the transmission, so that the output shaft of the transmission is locked when the pawl tooth 3 is in engagement with the tooth of the parking lock gear 5.

To bring about the engaged position of the pawl tooth 3 with the gear tooth 4 an actuation mechanism is provided, with which the engagement between the pawl tooth 3 and the gear tooth 4 of the parking lock gear 5 can also again be released. For that purpose an actuator, not shown in FIG. 1, can be provided in the form, for example, of an electric, pneumatic, or hydraulic drive, which also can be applied to the gear change operation of the shift mechanism. The actuator can thereby load a rod 6 to bring about and to release engagement by pulling and by pushing. The rod 6 can, for example, be arranged in the transmission housing as a shift rod, on which a shift fork opening is secured, which can be operated by a shift finger of a central selector shaft.

In the embodiment of the parking lock shown in FIG. 1, to bring about the engaged position the actuator exerts a force designated $F_{actuation}$, which is transmitted through rod 6, a spring element 7, and a roller 8 to the pawl 2, which roller 8 is supported by an opposing roller 9 that is supported on a bearing carried by the transmission housing 1. It is then conceivable that the pawl tooth 3 assumes a tooth-to-tooth position with the tooth 4 of the parking lock gear 5, so that the pawl tooth 3 does not engage with the gear tooth 4 of the parking lock gear 5. In that case a movement of rod 6 to the left in the plane of the drawing leads to compression of the spring element 7, so that by a small movement of the vehicle and the resulting rotation of the transmission drive shaft a rotation of the gear tooth 4 of the parking lock gear 5 takes place relative to the pawl tooth 3, and as a result the teeth come into engagement, whereby the drive shaft of the transmission is locked. So that the compression of the spring element 7 does not thereby lead to a movement of the rod 6 against the actuation force $F_{actuation}$ a stop 10 is provided that engages the rod 6 and thereby limits backward pressure of the rod 6, and an actuator in the form for example of an electric motor need not further be energized after the motor vehicle is parked.

Figure 2:
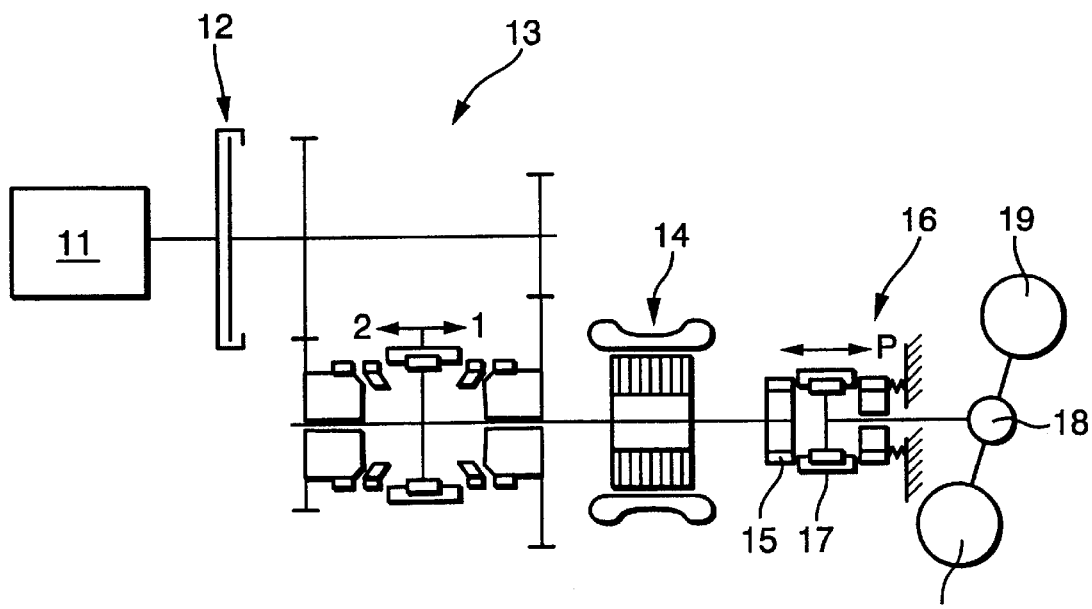
FIG. 2 a schematic representation of a drive train of a motor vehicle with a parking lock in the form of an interlocking shift coupling.

FIG. 2 of the drawings shows in a schematic representation the drive train of an automobile with a hybrid drive and a parking lock in the form of an interconnected shift coupling.

An internal-combustion engine 11 operates through a drive clutch 12 on a shift mechanism 13, to which an electric motor 14 is connected, which can operate as a starter-generator and also as an additional electric drive motor to deliver a driving torque to the drive train.

In the drive train according to FIG. 2 an interconnected shift coupling 15 is positioned behind the electric motor 14 to disconnect the drive train, and an interconnected shift coupling 16 that operates as a parking lock. The functions of the two shift couplings can be integrated into one shift coupling, and indeed by a corresponding movement of a sliding sleeve 17. Connected behind the shift coupling 15 and shown in a schematic manner there are arranged in addition a differential 18 and the drive wheels 19 of the motor vehicle.

During normal driving operation the internal-combustion engine 11 can produce a driving torque to the shift mechanism 13, which can be transformed through the gear pairs 1 and 2 that are shown only schematically, and can be effected as drive torque through the output shaft of the shift mechanism 13 to the drive wheels 19. Additionally, to produce increased acceleration of the motor vehicle, for example, the electric motor 14 can provide a driving torque to the drive wheels, or it can function as a generator. During normal driving operation the interconnected shift coupling 15 is engaged. When the vehicle is to be parked and the parking lock 16 is to prevent unintentional rolling of the vehicle, the sliding sleeve 17 is shifted in the rightward direction in the plane of the drawing by the actuator of the shift mechanism 13, which carries out the selection and shift procedures of the shift mechanism 13, so that the output side of the drive train connected with the shift mechanism 13 is locked, in which an internal gear of the sliding sleeve 17 engages with an axially-fixed and non-rotatable external gear of the shift coupling 16, which is secured to the transmission housing, for example. Rolling of the vehicle is prevented in that way. When the internal-combustion engine 11 is to be started the interconnected shift coupling 15 is disengaged by the actuator of the shift mechanism 13. Simultaneously the actuator of the shift mechanism can engage the interconnected shift clutch, by for example, the first movement of the shift mechanism 13, so that a torque exerted by the electric motor 14 on the drive side portion of the drive train operates on the internal-combustion engine 11 through the shift mechanism 13 and the drive clutch 12 to thereby enable it to be started. After starting the internal-combustion engine 11 the interconnected shift coupling 15 is closed by a corresponding movement of the sliding sleeve 17 by the actuator of the shift mechanism 13, and at the same time the shift coupling 16 opens the parking lock so that the internal-combustion engine 11 can exert a driving torque on the drive wheels 19.

Figure 3:
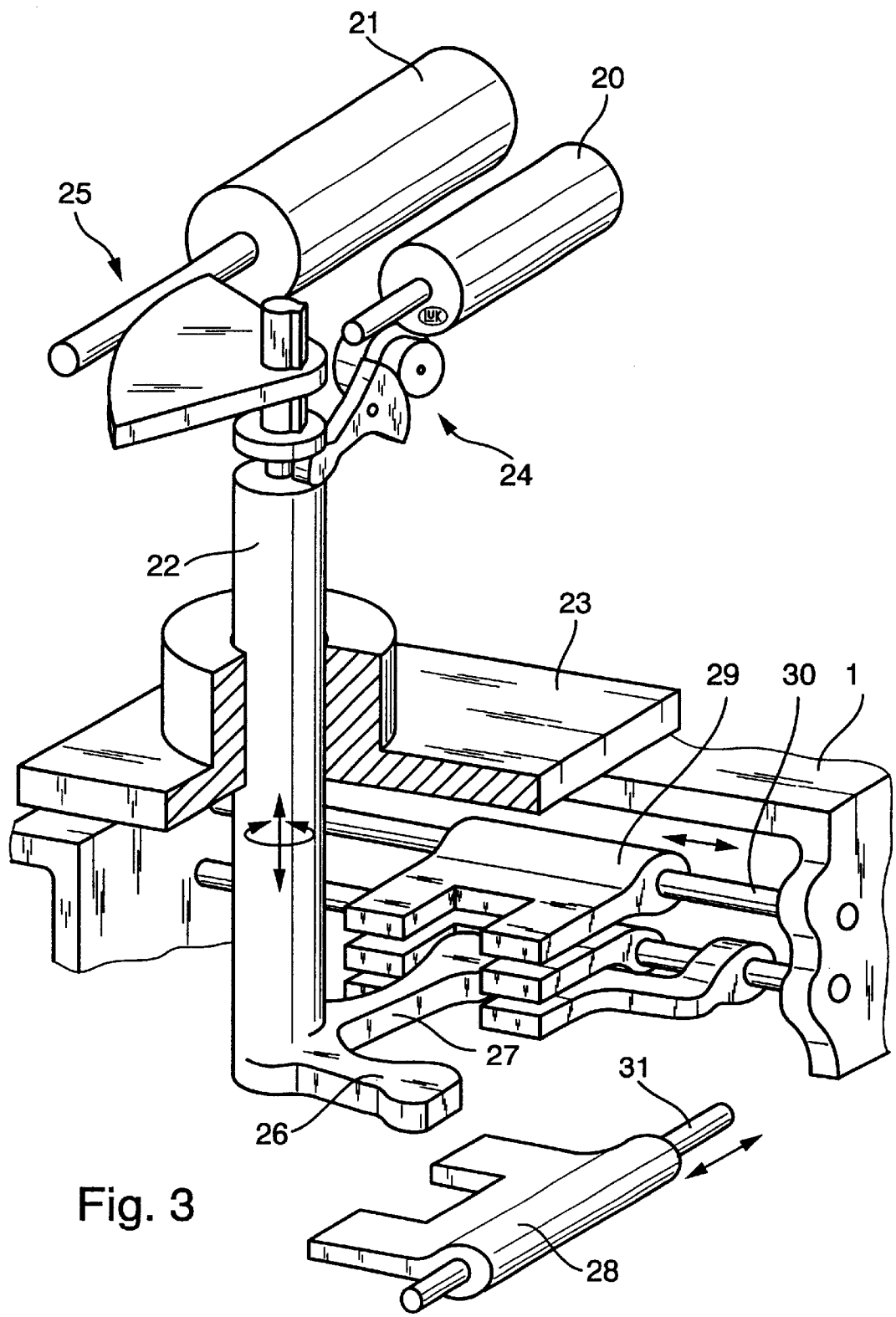
FIG. 3 a schematic representation of the activating mechanism for the individual gear steps of the shift mechanism and the parking lock.

FIG. 3 of the drawing shows a schematic representation of the internal actuation mechanism of the transmission for operating the parking lock.

In the embodiment represented in FIG. 3 there are provided an actuator 20 for the selection operation and an actuator 21 for the shifting operation. Actuators 20 and 21 operate a central selector shaft 22, which is rotatably supported and axially received in a passageway of a housing 23. In each case the actuators 20, 21 thereby transmit rotary motion through a linkage stage to the central selector shaft 22. The linkage stages 24, 25 can thereby be designed to be self locking, so that a force acting on the central selector shaft, that can originate in the pre-stressed spring element 7 of the parking lock apparatus, does not lead to an uncontrolled movement of the central selector shaft 22.

Provided on the central selector shaft 22 at the end opposite actuators 20, 21 are two selector fingers 26, 27, that can engage the openings of shift forks 28, 29. The shift forks 28, 29 are attached to shift rods 31, 30, respectively, that are supported in the transmission housing 1, through which the individual gear stages of the shift mechanism can be shifted.

The selector finger 26 serves to engage the opening of shift fork 28 that is mounted on shift rod 31, whereby through the shift rod 31, for example the rod 6 (FIG. 1), the parking lock can be actuated. When the parking lock of the shift mechanism is to be activated, then through the actuator 20 and the self-locking linkage stage 24 the central selector shaft 22 is moved axially so that the selector finger 26 engages with the opening of shift fork 28. Energizing actuator 21 leads through the linkage stage 25 to a rotary movement of the central selector shaft 22 and therewith to an axial displacement of the shift rod 31 and thereby to an actuation of the rod 6 with the actuation force $F_{actuation}$ and therewith to a locking of the parking lock.

In a similar manner the actuators or, when for the execution of the selection process and the shifting process only one actuator is in the assembly, the actuator of the parking lock 16 can also be operated in the form of a shiftable jaw clutch. In that way it is possible, for example, to operate the sliding sleeve 17 of the hybrid transmission according to FIG. 2 by the shift rod 31, that is, to utilize an actuator in the form of a shiftable jaw clutch for the gear shift process of the shift mechanism as well as for the opening and closing of the interconnected shift coupling 17 to disconnect and connect the drive train connected with the transmission and also for locking and unlocking the parking lock 16.

Figures 4, 5:
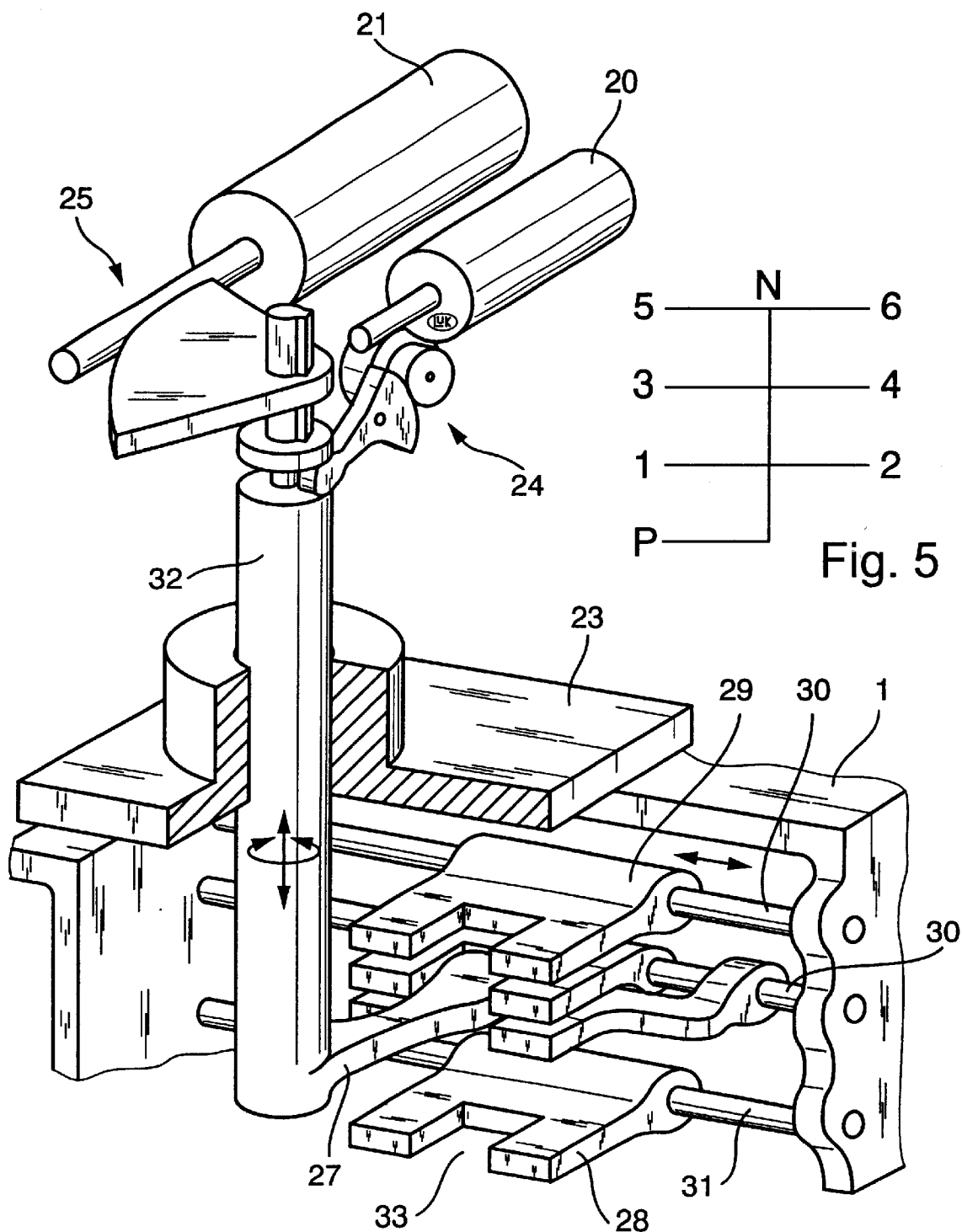
FIG. 4 a representation similar to that of FIG. 3 with a modified central selector shaft.
FIG. 5 a shift diagram.

Although the construction according to FIG. 3 can also be used for the actuation of the parking lock in the form of a jaw clutch, an alternative embodiment is represented in FIG. 4 with a modified central selector shaft 32 to actuate the shiftable jaw clutch 16. The construction of the actuation mechanism according to FIG. 4 differs from the construction of the activation mechanism according to FIG. 3 essentially by a modified central selector shaft 32. As is apparent from FIG. 4 without anything further, this has only one selector finger to operate the shift fork 29 for the change gear process and the shift fork 28 for operating the parking lock.

As shown on the basis of the shift diagram in FIG. 5, which represents six gear steps, that therefore results for example in five gears for the forward driving position and one gear for the reverse driving position, the parking lock designated by P can only be activated through the neutral path designated by N, so that therefore the matter of conflict between a change of gear and activation of the parking lock is excluded. If the user of a motor vehicle that is equipped with a shift mechanism with a parking lock has at least to a large extent brought the vehicle to a stop and wants to activate the parking lock he can bring the selector lever, arranged for that purpose in the interior of the vehicle, to the position P corresponding with the shift diagram, that leads the actuator 20 to lower the central selector shaft 32 along the neutral path so far that the selector finger 27 arrives at the opening of shift fork 28. A corresponding energization of actuator 21 leads to a rotation of the central selector shaft 32 and thereby a movement of shift rod 31, which actuates rod 6 (FIG. 1) but also moves the sliding sleeve 17 in the direction of the parking lock position designated by P (FIG. 2).

When the case arises for example in the drive train shown in FIG. 2 that one of the shift rods 30 must be moved to change a gear when the parking lock position is activated, when for example the internal-combustion engine 11 is to be started by the electric motor 14 when the interconnected shift coupling 15 is open and therewith a gear stage in transmission 13 is to be changed and in spite of that the vehicle is to be secured against rolling away, in addition to which the parking lock in the form of a shiftable jaw clutch or also in the form of a construction with a pawl and a parking lock gear is to remain closed, it is necessary to hold the parking lock engaged and to simultaneously carry out a shift process. For that purpose the shift fork opening 33 shown in FIG. 4 can be made wide, so that a rotation of the central selector shaft 32 opposite to the parking lock position does not lead to rotational movement that brings about operation of the shift fork 28, followed by a selection process produced through the actuator 20, that is consequently a lifting movement of the central selector shaft 32 in the illustrated embodiment, so that therefore the parking lock position of the parking lock is not changed. As an alternative to that it is also possible, as shown in the embodiment illustrated in FIG. 4, to introduce an additional neutral path, which can be implemented through a corresponding spacing of the shift fork 28 to the shift fork 29 arranged above it, so that after a rotation of the central selector shaft 32 and a corresponding actuation of the shift fork 28 the actuator 20 can be energized and thereby moves the selector finger 27 in an upward direction and out of the shift fork opening 33, without having to widen the shift fork opening 33.

A corresponding energization of the actuator 21 then leads to a rotational movement of the slightly raised central selector shaft 32, so that the selector finger 27 can be moved within the neutral path of the individual gears one to six. The parking lock is hereby found to be in its locked position after as well as before and despite that it is possible to shift into first gear, for example, so that the internal-combustion engine 11 can be started by the electric motor 14, through the shift mechanism 13, and the engaged drive clutch 12, while during that starting process the interconnected shift coupling 15 is open. After the starting process the drive clutch 12 will be disengaged, the interconnected shift coupling 15 will be engaged, and the parking lock 16 will be brought to its disengaged position, so that the drive train is ready to transfer torque from the internal-combustion engine 11 to the drive wheels 19.

In accordance with the invention a parking lock that is operated by an actuator of the transmission, or by the shift selector is provided for one such shift mechanism in the form, for example, of an automatic transmission, a load-based transmission, or a hybrid transmission. Besides operating the parking lock the shift selector can also be installed to operate an additional shift coupling, which can be utilized for example to disengage the transmission output shaft. The pre-tensioned spring provided in the operating mechanism of the parking lock also serves to forcibly bring about an interconnection when the parking lock parts are in a tooth-to-tooth position, by an only minimal relative movement of the motor vehicle and thereby the transmission output shaft or the drive side of the drive train. Although in the illustrated exemplary embodiments a central selector shaft of the shift mechanism was described, corresponding control movements in the transmission can also be developed as successive sequences, whereby for that purpose, for example, a control roller is provided for whose operation merely one individual actuator is needed.

The claims included in the application are exemplary and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A shift mechanism for a motor vehicle transmission, said shift mechanism comprising: at least one input shaft and an output shaft; a plurality of gears arranged to transfer power between the input and output shafts; a gear change actuator operable to selectively engage and disengage respective gears; and a parking lock coupled with the gear change actuator to block rotation of the output shaft upon actuation of the parking lock by the gear change actuator.

2. A shift mechanism according to claim 1, wherein the parking lock includes a parking lock gear non-rotatably arranged on a transmission shaft, a pawl that is selectively engageable with and disengageable from the parking lock gear, and a spring element to bias the pawl into engagement with the parking lock gear.

3. A shift mechanism according to claim 1, that wherein the parking lock is an interconnected shift coupling that is provided in a drive train of the motor vehicle between the transmission and a vehicle drive wheel and that blocks rotation of an output side-portion of the drive train.

4. A shift mechanism according to claim 2, wherein the actuator is biased by a spring provided in a pre-stressed condition.

5. A shift mechanism according to claim 4, including a retainer for retaining the actuator at a pre-stressed position of the spring.

6. A shift mechanism according to claim 4, wherein the actuator actuates the spring through a self-locking gear.

7. A shift mechanism according to claim 4, wherein the actuator is secured in position by a stop.

8. A shift mechanism according to claim 4, wherein the actuator is secured in position by a load moment lock.

9. A shift mechanism according to claim 1, wherein the transmission is an automatic transmission.

10. A shift mechanism according to claim 1, wherein the transmission can be shifted into a parking lock position only when all shift rods and actuation elements of the transmission are in a neutral position.

11. A shift mechanism according to claim 1, wherein the transmission can be shifted into a neutral position after it is in a parking lock position.

12. A shift mechanism according to claim 1, wherein the transmission can be shifted into forward movement position or into rearward movement position after it is in a parking lock position.

13. A shift mechanism according to claim 5, wherein the actuator is in a drive train that extends between the transmission and vehicle drive wheels.

14. A shift mechanism according to claim 5, wherein the actuator is within the transmission.

15. A shift mechanism according to claim 5, wherein the transmission includes a load-based shift coupling.

16. A shift mechanism according to claim 1, wherein the transmission is a shiftable transmission that includes a clutch the is shiftable when under load and without interruption of power flow.

17. A shift mechanism according to claim 1, wherein the transmission is a hybrid transmission coupled with an electric motor and with an internal combustion engine.

* * * * *